March 22, 1960

R. J. BARLOW ET AL 2,929,584

AIRCRAFT CONTROL SYSTEM

Filed April 21, 1955

INVENTORS
ROLAND JAMES BARLOW
JOHN JARVIS

BY Oscar B Brumback

ATTORNEY

March 22, 1960 R. J. BARLOW ET AL 2,929,584
AIRCRAFT CONTROL SYSTEM
Filed April 21, 1955 2 Sheets-Sheet 2

INVENTORS
ROLAND JAMES BARLOW
JOHN JARVIS
BY Orea B Brumback
ATTORNEY

United States Patent Office 2,929,584
Patented Mar. 22, 1960

2,929,584

AIRCRAFT CONTROL SYSTEM

Roland James Barlow, River Edge, and John Jarvis, Dumont, N.J., assignors to Bendix Aviation Corporation, Teterboro, N.J., a corporation of Delaware Application April 21, 1955, Serial No. 502,936

14 Claims. (Cl. 244—77)

This invention relates generally to control systems and, more particularly, to a control system for aircraft having several displaceable control surfaces for stabilizing the craft about one of its axes.

A large moment of force is required to move the control surface of a high speed aircraft with the rapidity necessary to stabilize the craft about its axis. In conventional linked tab arrangements, this moment is achieved by moving an auxiliary surface which, in turn, applies a torque or force to the main control surface. The total force required of the operator is a summation of forces including that force necessary to move the auxiliary surface, any component of the force required to move the main control surface which may be furnished by linkages, and any force required by "feel" mechanisms.

It is usually possible to move the control surface at a rate greater than the rate at which the craft is able to respond to the movement; and a follow up is provided so that the extent of the movement of the control surface will correspond to the extent of deviation of a craft from a reference condition. Since a lag exists between the deviation of the craft and the application of a corrective action due to the auxiliary surface being moved before the control surface is moved, oscillation of the craft may result because of excessive movement of the auxiliary tab. In accordance with the present invention, position transmitters are, therefore, used on both the servo and the main surface to maintain the movement of the surface proportional to the craft deviation from reference. Further, should any friction of sticking of the auxiliary surface occur, the operator may be required to exert the entire force on the main control surface.

An object of the present invention, therefore, is to provide a novel control system for controlling a craft by applying to the craft a corrective action which is proportional to the deviation of the craft from reference.

Another object is to provide a novel control system for an aircraft wherein the torque exerted on the control system is stabilized by a torque feed back arrangement.

A further object is to provide a novel control system for an aircraft wherein the control system is pre-conditioned during manual control of the craft to take over automatic control smoothly at any time.

The present invention contemplates a novel aircraft control system having a power means responsive to a signal corresponding to deviation of a craft from a predetermined reference for operating a signal device to maintain the input to the power means at zero during manual control of the craft, and during automatic control for displacing an auxiliary surface which applies a torque to the main surface to move it an amount corresponding to the extent of deviation, the signal device at this time serving as a follow up for the auxiliary surface (the housing of the motor tending to turn in a direction counter to the direction of torque applied to the surface), and a means resisting the torque by a deflectable mechanism to provide a feed back signal to stabilize the torque of the motor.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

In the drawings wherein like parts are marked alike;

Figure 1:
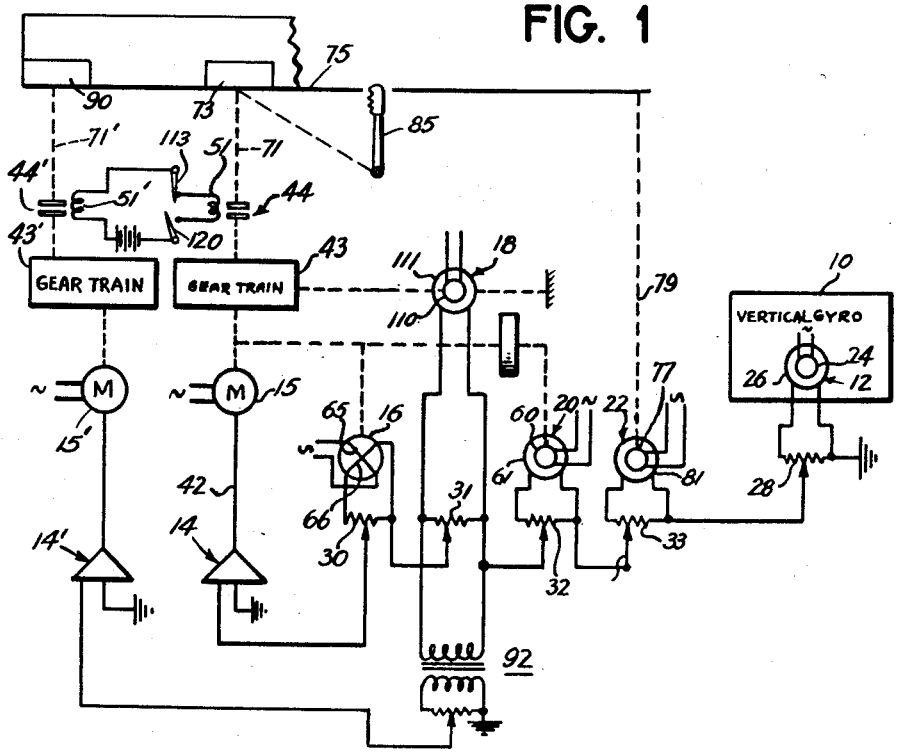
Figure 1 illustrates schematically a single control channel of an aircraft automatic pilot system made according to the present invention.

While an automatic control system for an aircraft includes a control channel for controlling the craft about each of its three axes, only the pitch control channel is shown in Figure 1 for purposes of simplicity, it being understood that the arrangement may be applied with suitable modification to each of the other channels. The pitch control channel may be comprised of a vertical gyro 10 with an inductive device 12 for developing a pitch attitude signal, an amplifier 14, a motor 15 for moving control linkages to the surface, a rate generator 16 for developing a signal corresponding to the velocity of the motor, inductive device 18 for developing a signal corresponding to the torque exerted by the motor, an inductive device 20 for developing a signal corresponding to the extent of displacement of the motor from a neutral position, and an inductive device 22 for developing a signal corresponding to the displacement of the surface from a neutral position.

Vertical gyro 10 may be of a conventional type, and inductive device 12 may be connected to the gyro in a known manner so that relative displacement of the craft from a predetermined pitch attitude causes relative displacement of rotor 24 and stator 26 to develop across potentiometer 28 a signal corresponding in phase and amplitude to the direction and extent of displacement of the craft. When signal devices 16, 18, 20 and 22 are in a neutral position, no signals appear across potentiometers 30, 31, 32 and 33 to modify the attitude displacement signal across potentiometer 28, and the signal is applied to amplifier 14.

Amplifier 14 may be generally similar to that described in Patent No. 2,625,348 issued January 13, 1953 to Noxon et al. The low value of the attitude signal is raised by amplifier 14 to a level sufficient to actuate motor 15. The signal is also discriminated in amplifier 14 so as to operate the motor in a clockwise or counter-clockwise direction to displace the elevator linkages to return the craft to the predetermined attitude.

Figure 2:
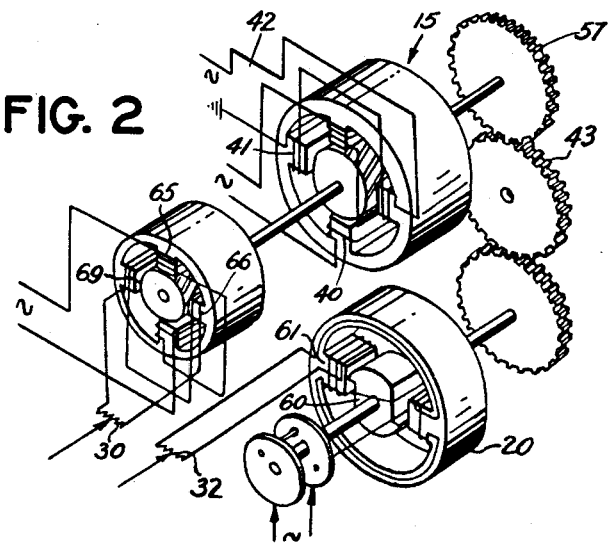
Figure 2 illustrates schematically the induction motor, rate generator, and shaft position transmitter of Figure 1.

Motor 15 may be of a conventional induction type having a fixed phase and a variable phase winding. The fixed phase winding 40, Figure 2, is constantly energized, and the variable phase winding 41 is connected by lead 42 to amplifier 14. Depending upon the phase of the voltage in the variable phase winding, motor 15 is operated in a clockwise or counterclockwise direction to drive a gear train 43. The driving connection between the gear train and the surface is established by a servo clutch 44.

Figure 3:
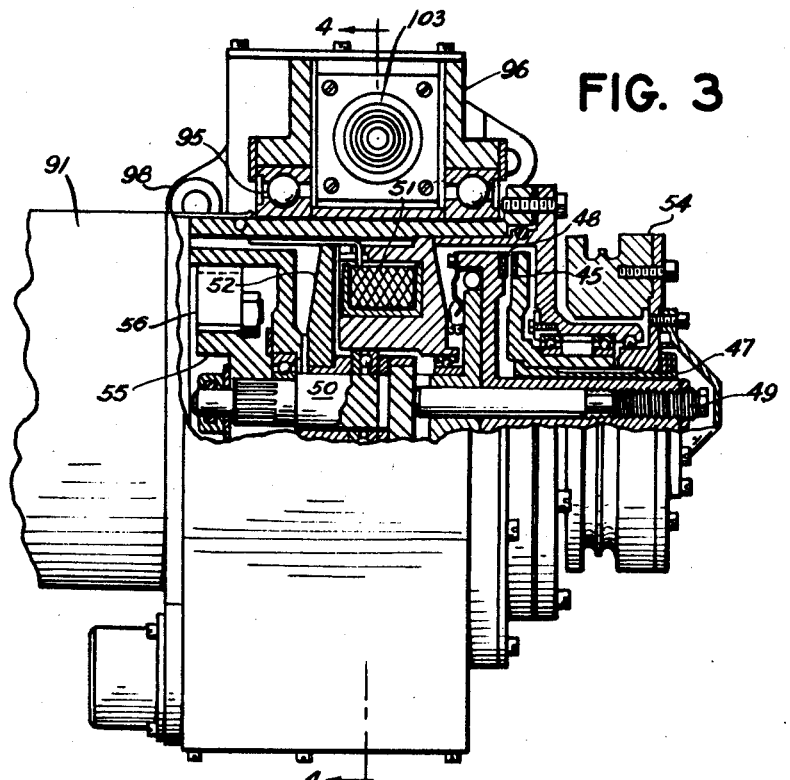
Figure 3 is a plan view of an embodiment of the motor arrangement of Figure 1 with portions broken out.

Servo clutch 44, Figure 3, has one face 45 fixed to a shaft 47 and the other 48 fixed to a shaft 49, this shaft being keyed to a shaft 50 but is slidable longitudinally thereon. These faces are engaged by a solenoid coil 51. When energized, the solenoid 51 urges a core 52 to the right, stressing spring 53 to engage faces 45 and 48 and connect shafts 49 and 47. Shaft 47 is connected by a pulley 54 and suitable means (not shown) to the movable control surfaces. A gear 55 fixed to the end of shaft 50 engages with a pinion 56 of a gear train 57 in the gear train 43.

Shaft position transmitter 20 measures the extent of operation of motor 15. This may be a conventional inductive device having a relatively displaceable rotor and stator. Rotor winding 60 is energized from a suitable source of alternating current (not shown) and stator winding 61 is connected across potentiometer 32. The rotor is displaced angularly relative to the stator through suitable gearing by motor 15 to develop across potentiometer 32 a signal in opposition to the command signal input to amplifier 14.

Rate generator 16 tends to prevent overshooting of the ordered position due to the inertia of the moving parts of motor 15 and also tends to cause the motor to rotate at a speed proportional to the input signal to the amplifier. This rate generator may be conventional, having two field windings and a squirrel cage rotor. Winding 65 is energized by a suitable source of alternating current; winding 66 is connected across potentiometer 30; and rotor 69 is driven by the shaft of motor 15 to generate across potentiometer 30 a signal which has an amplitude proportional to the speed of rotation of the shaft. This signal is applied to the amplifier input in opposition to the command signal. Thus, the signal from the rate generator decreases the total signal to the amplifier when the speed of motor 15 tends to increase beyond a value determined by the amplitude of the combined signal to the amplifier input, thereby reducing the speed of the motor. Also, the substraction of the rate signal from the command signal decreases the total signal input to the amplifier to zero sooner than normal so that the motor slows to a stop, with the rate generator signal providing a braking action to prevent overshooting.

Motor 15 does not displace the main control surface directly but instead through a suitable control linkage 71 displaces an auxiliary control surface 73 which, then, operates to the main control surface 75 by aerodynamic reaction to displace it. In order to stop the operation of motor 15 when the main control surface has been sufficiently displaced, the rotor 77 of surface position transmitter 22 is connected by a suitable mechanical connection 79 to the control surface 75. Thus, rotor 77 is angularly displaced relative to a stator 81 as the control surface 75 is moved from the normal position, thereby developing a corresponding signal across potentiometer 33.

Figure 4:
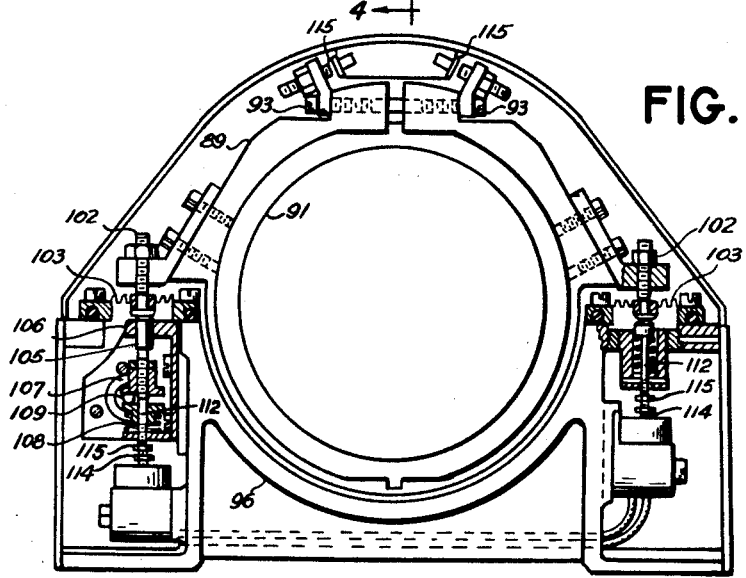
Figure 4 is a view taken along sectional lines 4—4 of Figure 3, which shows the torque sensing arrangement.

Inductive device 18 provides a signal corresponding to the torque exerted on the control surface linkages by servomotor 15. A sleeve 89, Figure 4, is attached to the frame 91, enclosing the stator of the motor by suitable means, such as bolts 93. The sleeve is journaled by bearings 95, Figure 3, for rotation in a cradle 96 that is secured to the airplane by suitable means, such as bolts 98.

As the motor exerts a torque on the control surface linkages, the stator of the motor tends to turn in an opposite direction. Projecting pins 102 engage diaphragms 103 which resist this tendency. The extent of the displacement of projection 102 in either direction from a normal position depends upon the torque exerted on the surface.

To measure the torque, one pin 102 engages a further pin 105 which is slidable in a bracket 106 and has thereon a pair of arms 107 and 108 which engage a projection 109 fixed eccentrically to the shaft of rotor 110 of inductive device 18. Thus, linear displacement of the pin angularly displaces the rotor 110, Figure 1, relative to the stator 111 by an amount corresponding to the torque exerted on the surface. This rotor displacement develops a corresponding signal across potentiometer 31. When the torque exceeds a predetermined amount, one of the switch posts 112 is depressed opening switch 113, thereby deenergizing coil 51 and disengaging the servomotor from the control surface, or in an alternate method (not shown) of control deenergizing the fixed phase of the motor. Stops 114 and 115 are provided to prevent the servomotor from rotating beyond a limited extent.

Auxiliary surface 73 may be operated manually by way of a conventional control column 85 or automatically by way of motor 15. When the control surface is being displaced manually, the automatic control system is continuously preconditioned for the existing attitude of the craft. Thus, the automatic control system may be engaged at any time to take over control of the craft smoothly.

An operator-operative switch 120 is at the position shown for the manual control of the craft. No torque is exerted on the control surface by motor 15 because coils 51 and 51' are deenergized and clutches 44 and 44' disengaged. Inductive device 18 will be at a null position, but inductive devices 12 and 22 may not be at a null position because the attitude of the craft or the position of the main control surface 75 may not be at normal. Motor 15 operates in response to any signal existing in the signal chain until the relative displacement of rotor 60 and stator 61 of inductive device 20 develops a signal across potentiometer 32 of such magnitude as to reduce the input to amplifier 14 to zero. Rate generator 16 provides a feedback signal to damp the motor operation. Since the input to amplifier 14 is maintained at zero, the automatic control system may be engaged to control the craft smoothly at any time.

When the craft is at a predetermined attitude and surface 75 is in its normal position, no signal is developed across potentiometers 28 and 33. Moving switch 120 to a closed circuit position energizes coil 51 and engages clutch 44, thereby drivably connecting motor 15 and auxiliary surface 73.

Any displacement of the craft from this attitude is measured by vertical gyro 10 and rotor 24 is displaced relative to stator 26 to develop a signal across potentiometer 28 corresponding in phase and amplitude to the direction and extent of displacement. Through amplifier 14 this signal operates motor 15 in a direction to correct for the deviation by displacing the auxiliary surface 73 of the main control surface 75, such control systems being conventionally known as linked tab systems. The motor also turns the rotor of rate generator 16 and the rotor of inductive device 20. Rate generator 16 develops a feedback signal across potentiometer 30 so that the speed of operation of motor 15 will correspond to the amplitude of the attitude displacement signal. Inductive device 20 develops across potentiometer 32 a signal having an amplitude and phase corresponding to the extent and direction of motor operation. When this latter signal becomes equal and opposite to the signal from potentiometer 28, the net input to amplifier 14 is zero and motor 15 stops.

As the displaced auxiliary surface 73 exerts a torque on the main control surface 75, the main control surface is displaced from normal position and through mechanical linkage 79 displaces rotor 77 relative to its stator 81 to develop a signal across potentiometer 33. As this signal builds up to equal and oppose the displacement signal across potentiometer 28, the motor shaft position signal across potentiometer 32 operates motor 15 to return the tab surface to its neutral position.

As the displaced elevator surface returns the craft to its predetermined pitch attitude, the signal across potentiometer 28 decreases. The signal across potentiometer 33, then, prevails to operate motor 15 to displace the auxiliary surface in an opposite direction to return the main control surface to its neutral position. Depending upon the torque exerted by the motor on the auxiliary surface, a signal is built up at inductive device 18 and across potentiometer 31 to oppose the primary control signal from potentiometer 28 or 33, as the case may be. These signals become zero as the craft attains the predetermined pitch attitude.

When desired, the torque signal from inductive device 18 can be utilized to operate the trim tab 90 of the surface. To this end, an amplifier 14', an induction motor 15', gear train 43', and clutch 44' are provided, these may be similar to the coresponding parts without prime numbers described above. Motor 15' is connected to trim tab 90 by a suitable mechanical connection 71'. When coil 51 is energized, coil 51' is also energized to connect motor 15' with trim tab 90. The signal from inductive device 18 is applied to amplifier 14' by way of a conventional coupling transformer 92. Thus, when a torque is exerted by motor 15, a signal corresponding to this torque is applied to motor 15'. Motor 15', however, is arranged to displace trim tab 90 at a slow rate so that only sustained torque signals will result in substantial displacement of the trim tab surface.

The foregoing has presented a novel control system particularly adapted for craft wherein an auxiliary and a main control system of the linked tab arrangement are used. The system displaces the auxiliary surface and the main control surface in an amount sufficient to correct of any deviation of the craft from a standard condition. Provision is also made for stabilizing the torque by feeding back a torque signal to the motor.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. In a control system for the main control surface of a craft operated by an auxiliary control surface through aerodynamic reaction, reference means for providing a command signal, power means responsive to said signal and operable for displacing said auxiliary surface, a feedback loop for said power means including means for developing a signal proportional to the extent of operation of said power means, means for developing a signal proportional to the rate of operation of said power means, means for developing a signal proportional to the force exerted on said auxiliary surface by said power means, means for developing a signal corresponding to the displacement of said main surface, means for summing said signals, and means for feeding said summation signal to said power means in opposition to said command signal.

2. In a control system for moving the auxiliary control surface of a craft for operating a main control surface by aerodynamic reaction, a motor operable in response to an input signal, means operable by said motor to reduce said input signal to zero, means connecting said motor and said auxiliary surface, whereby operation of said motor moves said auxiliary surface, means for developing a signal corresponding to the extent of movement of said auxiliary surface, means for developing a signal corresponding to the torque exerted by said motor on auxiliary said surface, and means for opposing said input signal by said last named two signals.

3. In a control system for a craft having a displaceable auxiliary surface operating a main control surface by aerodynamic reaction, means for developing a command signal, a motor operable by said signal, means for developing a signal corresponding to the extent of operation of said motor, means for developing a signal corresponding to the rate of motor operation, means for connecting said motor to and disconnecting said motor from said auxiliary surface, means for developing a signal corresponding to the torque exerted by said motor on said auxiliary surface, means for developing a signal corresponding to the extent of displacement of said main surface from normal position, and means for opposing said command signal by said other signals.

4. In a steering system wherein an auxiliary control surface is displaceable from a normal position to provide a torque by aerodynamic reaction for displacing a main control surface from a normal position, a motor, means for connecting and disconnecting said motor and auxiliary surface, means for providing a command signal to said motor, means for developing a signal corresponding to the rate of operation of said motor, means for developing a signal corresponding to the extent of movement of said main surface from said normal position, and means for opposing said command signal by said other signals.

5. A control system for operating a control surface of a craft having a main control surface and an auxiliary control surface with the main surface being operated by the auxiliary surface through aerodynamic reaction, comprising power means operable for moving the auxiliary surface, reference means for developing a signal for operating said power means, first means for developing a signal corresponding to the extent of operation of said power means, second means for developing a signal corresponding to the effort exerted by the operation of said power means, third means for developing a signal corresponding to the rate of operation of said power means, fourth means for developing a signal corresponding to the extent of movement of the main surface, and means operatively connecting said signals developed by said first, second, third and fourth means in opposing relation to said reference signal to control the operation of said power means.

6. In a control system for a craft having a main and an auxiliary control surface, a motor, means for connecting and disconnecting said motor and said auxiliary control surface whereby said motor may be connected to said auxiliary surface for moving the latter and may be disconnected from said surface so the latter may be moved manually, first and second signal devices connected in opposition to said motor, reference means responsive to deviation of the craft for actuating said first signal device to develop a corresponding signal, said motor being responsive to the difference in signal of said first and second devices and actuating said second signal device to reduce said difference to zero when said motor and auxiliary surface are connected and disconnected.

7. In a control system for a craft having a main and an auxiliary control surface, a motor, means for connecting and disconnecting said motor and said auxiliary control surface, whereby said motor may be connected to move said auxiliary surface and may be disconnected from said surface so that said surface may be moved manually, first and second signal devices connected to said motor, reference means responsive to deviation of the craft for actuating said first signal device to develop a corresponding signal, said motor in response to the difference in signals from said devices actuating said second signal device to reduce said difference to zero when said motor and auxiliary surface are connected and disconnected, said auxiliary surface operating the main surface by aerodynamic reaction, means for developing a follow up signal corresponding to the displacement of said main surface, and means for feeding the latter signal to said motor.

8. In a control system for a craft having a main and an auxiliary control surface, a motor, means for connecting said motor and said auxiliary control surface so that said motor may move said auxiliary surface and for disconnecting said motor from said surface so that said surface may be moved manually, first and second signal devices connected to said motor, reference means responsive to deviation of the craft for actuating said first signal device to develop a corresponding signal, said motor being actuated in response to the difference in signals from said devices for actuating said second signal device to reduce said difference to zero when said motor and auxiliary surface are connected and disconnected, movement of said auxiliary surface operating the main surface by aerodynamic reaction, a third signal device for developing a follow up signal corresponding to the displacement of said main surface, a fourth signal device for developing a signal corresponding to the torque exerted by said motor on said auxiliary surface, and means for connecting said third and fourth signal devices to said motor so that the third and fourth signals oppose the signal from said first device.

9. A control system for a craft having a displaceable main control surface with an auxiliary control surface and a trim tab surface, reference means for developing a command signal, a first motor operable for displacing said auxiliary surface, means for developing a signal corresponding to the extent of motor operation, means for developing a signal corresponding to the rate of motor operation, means for developing a signal corresponding to the applied motor torque, the displacement of said auxiliary surface operating the main surface by aerodynamic reaction, means for developing a signal corresponding to the extent of displacement of said main surface, means connecting said signal means to said motor for operating the latter with the command signal opposed by the other signals, a second motor connected to said trim tab surface, and means for operating said second motor in response to said torque signal to displace said trim tab surface.

10. In a system for rotating a control surface of a craft of a type including a shaft, means for connecting said shaft to said surface, power means for turning said shaft; the improvement comprising mounting means for resiliently supporting said power means in such a manner that as said power means tends to apply a torque to said surface said power means tends to rotate in said mounting means, torque responsive means connecting said power means and said mounting means for resiliently resisting said rotation, the torque applied by said power means tending to cause a deflection of said last-named connecting means in response thereto, means operated by said torque responsive means for developing a signal corresponding to said deflection of the torque responsive means, and means to apply said signal to said power means to decrease the torque exerted thereby.

11. In a control system for a craft surface of a type including an induction motor having a rotatable shaft, means for connecting said shaft and said surface, and means for developing a command signal for said motor; the improvement comprising a torque responsive means for sensing torque applied by said motor through said shaft to said surface including means for resiliently mounting said motor, said motor tending to rotate in said resilient mounting as it applies a torque through said shaft to said surface in response to said signal, and means operatively connected to said motor and said mounting means and deflected in a direction and an extent proportional to the torque applied to said shaft to develop a counter signal, and means to apply said counter signal to said motor in opposition to said command signal.

12. In a control system for a craft surface of a type including a motor, and means for connecting said motor and surface; the improvement comprising a torque responsive means including means resiliently mounting said motor, said motor tending to rotate in said resilient mounting means as the torque of the motor is resisted by the surface, signal developing means on said resilient mounting means and operatively engaged by said motor for deflection by an amount corresponding to the torque exerted by said motor, and means to apply said signal to said motor to decrease the torque exerted by said motor.

13. In a control system for a craft having a main control surface and an auxiliary control surface wherein the auxiliary surface is selectively movable manually and automatically, a first signal device, means responsive to deviation of the craft from a predetermined reference for actuating said first signal device to develop a corresponding signal, a second signal device to develop a second signal, power means responsive to a net controlling signal from said signal devices for actuating said second signal device to vary said second signal so as to tend to maintain the net controlling signal at zero, the signals from said first and second devices being in opposition, coupling means operable in one sense for disconnecting said power means and said auxiliary surface whereupon said power means actuates said second signal device so as to maintain the net signal to said power means at zero and said coupling means operable in another sense for connecting said power means and said auxiliary surface so that in response to the net controlling signal said power means displaces said auxiliary surface which then applies a torque to the main surface, the second signal developed by said second signal device thereupon serving as a follow up for said auxiliary surface, means for developing a signal corresponding to the displacement of said main surface, and means for applying said last-named signal to said power means in opposition to the signal developed by the first signal device so as to reduce the net controlling signal to zero.

14. A control system for a craft having a main control surface operated by an auxiliary control surface through aerodynamic reaction, comprising a motor drivably connected to the auxiliary surface, reference means for providing a reference signal, means responsive to motor operation and providing a follow-up signal, means responsive to movement of the main surface and providing a signal corresponding to the displacement of the main surface, and means for controlling operation of the motor by the signals.

References Cited in the file of this patent

UNITED STATES PATENTS

| | | |
|---|---|---|
| 2,316,235 | Gast | Apr. 13, 1943 |
| 2,524,361 | Sawyer et al. | Oct. 3, 1950 |
| 2,626,114 | Alderson | Jan. 20, 1953 |
| 2,666,177 | Brannin | Jan. 12, 1954 |
| 2,740,082 | Sedgfield | Mar. 27, 1956 |